(12) United States Patent
Van Andel et al.

(10) Patent No.: US 12,467,905 B2
(45) Date of Patent: Nov. 11, 2025

(54) IN-LINE INSPECTION AND CRACK DETECTION

(71) Applicant: Quest Integrity USA, LLC, Houston, TX (US)

(72) Inventors: Petrus Wilem Van Andel, Zevenaar (NL); Robert Victor De Lorenzo, Seattle, WA (US); Paul Manzak, Stafford, TX (US)

(73) Assignee: QUEST INTEGRITY USA, LLC, Houston, TX (US)

( * ) Notice: Subject to any disclaimer, the term of this patent is extended or adjusted under 35 U.S.C. 154(b) by 0 days.

(21) Appl. No.: 18/717,055

(22) PCT Filed: Dec. 15, 2022

(86) PCT No.: PCT/US2022/053047
§ 371 (c)(1),
(2) Date: Jun. 6, 2024

(87) PCT Pub. No.: WO2023/114424
PCT Pub. Date: Jun. 22, 2023

(65) Prior Publication Data
US 2024/0418678 A1    Dec. 19, 2024

Related U.S. Application Data

(60) Provisional application No. 63/290,219, filed on Dec. 16, 2021.

(51) Int. Cl.
*G01N 29/04* (2006.01)
*G01M 3/00* (2006.01)
(Continued)

(52) U.S. Cl.
CPC .......... *G01N 29/043* (2013.01); *G01N 29/07* (2013.01); *G01N 29/225* (2013.01);
(Continued)

(58) Field of Classification Search
USPC ......................................................... 73/598
See application file for complete search history.

(56) References Cited

U.S. PATENT DOCUMENTS

| 4,300,215 A | 11/1981 | Jones | |
| 4,884,696 A * | 12/1989 | Peleg | ...................... B07C 5/342 |
| | | | 209/912 |

(Continued)

FOREIGN PATENT DOCUMENTS

WO    2007125308 A2    11/2007

OTHER PUBLICATIONS

International Search Report and Written Opinion mailed Mar. 10, 2023, issued in corresponding international Application No. PCT/US2022/053047, filed Dec. 15, 2022, 7 pages.

*Primary Examiner* — Jacques M Saint Surin
(74) *Attorney, Agent, or Firm* — Christensen O'Connor Johnson Kindness PLLC

(57) ABSTRACT

A technique facilitates in-service inspection of a variety of assets while in the field. The system and technique may be used for the in-service inspection of various tubular elements, such as deep-water oil and gas risers and flow lines. This approach enables a rapid and reliable inspection for cracks or other defects in assets after those assets have become operational in the field.

11 Claims, 5 Drawing Sheets

(51) Int. Cl.
*G01N 29/07* (2006.01)
*G01N 29/22* (2006.01)
*G01N 29/265* (2006.01)

(52) U.S. Cl.
CPC ........... *G01N 29/265* (2013.01); *G01M 3/005* (2013.01); *G01N 2291/011* (2013.01); *G01N 2291/0289* (2013.01); *G01N 2291/0422* (2013.01); *G01N 2291/106* (2013.01); *G01N 2291/2636* (2013.01)

(56) References Cited

U.S. PATENT DOCUMENTS

| | | | |
|---|---|---|---|
| 5,400,788 A * | 3/1995 | Dias | A61B 8/0833 600/459 |
| 6,171,025 B1 * | 1/2001 | Langner | G01M 3/283 73/40.7 |
| 6,959,603 B2 | 11/2005 | Knight et al. | |
| 7,950,284 B2 * | 5/2011 | Dijkstra | G01N 29/225 73/602 |
| 2005/0072237 A1 * | 4/2005 | Paige | G01N 29/265 73/623 |
| 2020/0209198 A1 * | 7/2020 | Phipps | G01N 29/262 |

\* cited by examiner

IN-LINE INSPECTION AND CRACK DETECTION

This application is a National Stage of International Application No. PCT/US2022/053047, filed Dec. 15, 2022, which claims the benefit of Provisional Application No. 63/290,219, filed Dec. 16, 2021, which is incorporated herein by reference.

FIELD OF DISCLOSURE

In general, the disclosure describes an inspection system and technique for use with risers, flowlines, and other tubular elements. The inspection system facilitates reliable in-service inspection for cracks and other defects in a variety of assets.

BACKGROUND OF DISCLOSURE

Various techniques are employed for inspecting many types of tubing or other assets. For example, pipe girth welds used in deep-water oil and gas applications are inspected during fabrication prior to installation using an external technique such as automated ultrasonic testing (AUT). AUT requires a system qualification program for each specific project. Then, a fracture mechanics approach, commonly referred to as an engineering critical assessment, is used to conservatively calculate circumferential girth weld flaw sizes (internal, external, and embedded) that will not grow to an unsafe size during the design life of the asset. Weld repair criteria (or flaw acceptance criteria) are then developed for addressing flaws during fabrication.

What is needed is a reliable, in-service inspection system and technique which may be employed to help properly manage the integrity of an asset through its life in the field.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limiting the scope of the claimed subject matter.

According to an embodiment, a system and methodology are provided for facilitating in-service inspection of a variety of assets while in the field. The system and technique may be used for the in-service inspection of various tubular elements, such as deep-water oil and gas risers and flow lines. This approach enables a rapid and reliable inspection for cracks or other defects in assets after those assets have become operational in the field.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and.

DETAILED DESCRIPTION

Figure 1:
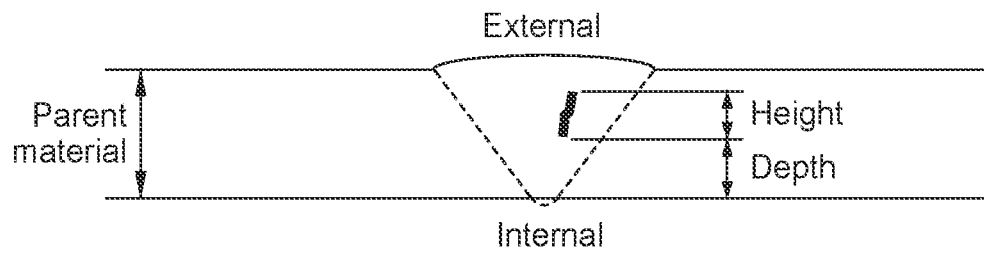
FIG. 1 is an illustration of an example of a weld with cracks in a tubular element.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements.

The present disclosure generally relates to a system and methodology for facilitating in-service inspection of a variety of assets while in the field. The system and technique may be used for the in-service inspection of various tubular elements, such as deep-water oil and gas risers and flow lines. By way of example, the system and technique may be used to acquire valid and reliable inspection data on risers and flow lines so as to properly assess the condition of these important assets in support of optimizing corrosion inhibition programs, enhancing well stimulation efforts, estimating remaining fatigue lives, extending the design life of a system, and providing integrity management through a full lifecycle of an asset. This approach enables a rapid and reliable inspection for cracks or other defects in assets after those assets have become operational in the field. It should be noted the data obtained also may be used in probabilistic fracture mechanics methods used to model findings from repeat in-service inspections and for supporting reliability-based inspection planning.

There is increasing demand for safe and reliable technology for in-service inspection of cracks in deep-water oil and gas risers to aid in properly managing the integrity of the asset to the life-of-field. For example, important welds are located at the top of platforms and at the touchdown point. Techniques described herein facilitate the inspection of such welds and also enable the inspection of a greater number of welds while the asset is in service. The technique also may be used with respect to corrosion inspection which can lead to cracking.

Although AUT techniques have been employed, existing systems are difficult to employ in small diameter tubulars, e.g. small diameter risers, because the ultrasonic components may not fit in the small diameter available. Existing systems also can cause undesirable disturbance with respect to top side operations, however the system and techniques described herein provide a minimally invasive inspection approach for in-service inspection. Inspection system embodiments described herein may be used on deep-water risers, flowlines, and pipelines with heavy wall thicknesses ranging from, for example, approximately 0.75 to 1.5 inches and having internal diameters ranging from approximately 4 to 16 inches.

Referring generally to FIG. 1, a schematic illustration is provided to show crack height and crack depth with respect to a crack found in a weld. The crack height/depth is readily determined via embodiments of the inspection techniques described herein, e.g. ultrasonic techniques. It should be noted that the ultrasonic in-line inspection systems/tools described herein may be used in a liquid medium within the tubular element, e.g. within the pipeline, to ensure propagation of the ultrasonic wave. The inspection methodology is able to measure, for example, fatigue cracks at welds in steel catenary risers and other tubular elements. The inspection methodology effectively utilizes in-line, in-service inspection tools which may be used for girth weld crack detection in risers and flowlines in a variety of offshore applications.

Figure 2:
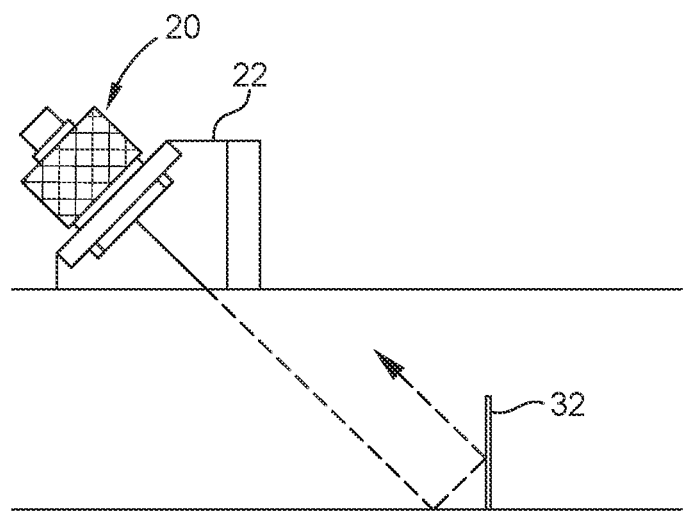
FIG. 2 is an illustration of a corner reflection technique which may be employed in embodiments of the system and methodology described herein in accordance with embodiments of the present disclosure.
Figure 3:
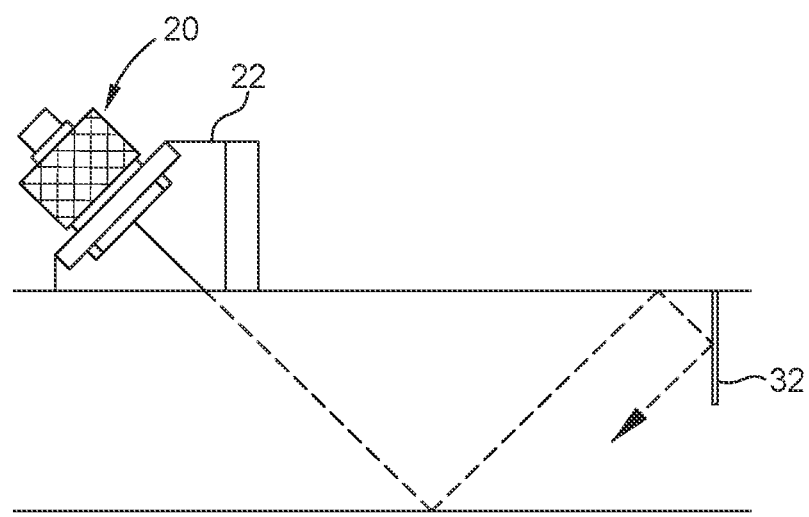
FIG. 3 is another illustration of the corner reflection technique illustrated in FIG. 2 in accordance with embodiments of the present disclosure.

Referring generally to FIGS. 2 and 3, some embodiments of the system described herein utilize corner reflection (CR) techniques for detection and sizing of surface breaking cracks which can result from stress corrosion cracking. As illustrated, a transducer 20 is positioned on a transducer mount 22 to produce an ultrasound shear wave at a desired angle, e.g. a 45° angle. As a result, the shear wave is reflected back to the transducer 20 when either an inside diameter crack 30 (see FIG. 2) or an outside diameter crack 32 (see FIG. 3) is in the path of the shear wave. As described in greater detail below, properly designed structures with multiple transducer elements may be utilized with an in-line inspection (ILI) tool. For example, a free-swimming ILI tool may be positioned on, for example, a pig and moved along the interior of a tubular element via fluid.

According to an embodiment, desirable CR results can be obtained with a free-swimming ILI tool utilizing a highly integrated phased array conical transducer nng. Additionally, methodologies utilizing a tandem technique, tip diffraction, and multiple transducer rings may be employed as described in greater detail below. These improvements may be modeled accurately with various types of simulation software for ultrasonic propagation and defect interaction, e.g. simulation software for nondestructive testing such as CIVA.

Figure 4:
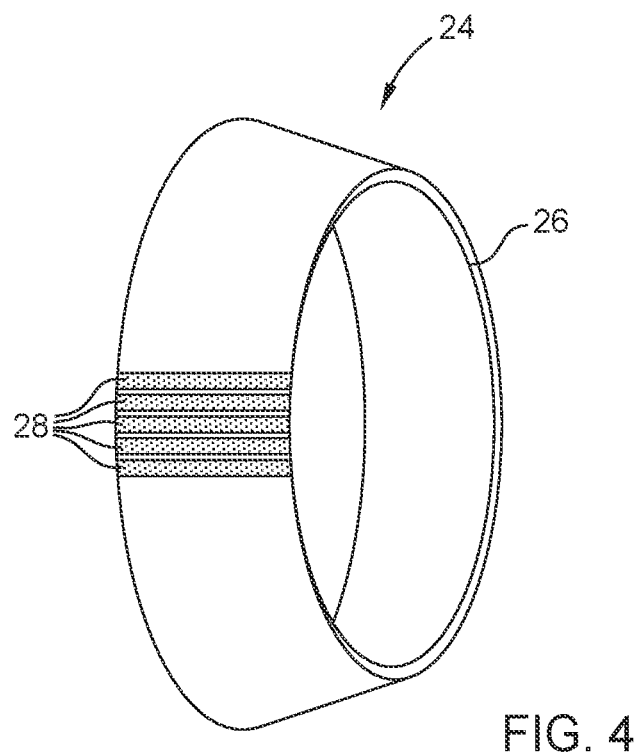
FIG. 4 is an illustration of a system having a transducer array arranged to facilitate detection of cracks from within a tubular element in accordance with embodiments of the present disclosure.

Referring generally to FIG. 4, an example of an in-service inspection tool 24 is illustrated as comprising a conical transducer ring 26 which may be mounted on a pig or other free-swimming device to enable ILI crack detection. In this example, the conical transducer ring 26 is combined with an array of transducer elements 28, e.g. ultrasonic transducer elements, to form an overall highly integrated phased array conical transducer ring. Integration of the array of transducer elements 28 on transducer ring 26 enables miniaturization of the overall tool and solves the problem of limited space within small diameter tubular elements. If the conical transducer ring 26 and transducer elements 28 are moved through the interior of a tubular element via oil or water, the transducer elements 28 are arranged at a suitable angle, e.g. 17° or 19° to generate a desired 45° shear wave in the wall of the surrounding tubular element. This may be achieved by forming the conical transducer ring 26 at the appropriate angle so as to hold the transducer elements 28 at this desired angle, as illustrated in FIG. 4.

Figure 5:
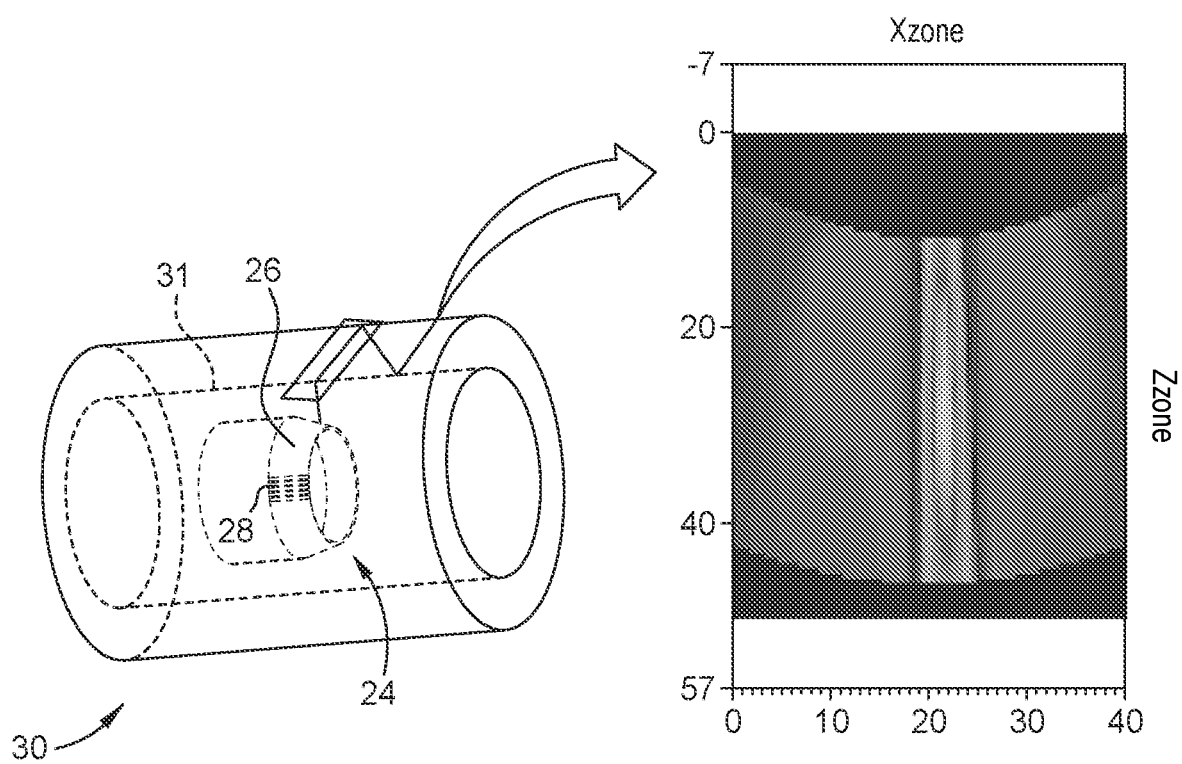
FIG. 5 is an illustration of the system illustrated in FIG. 4 deployed in a tubular element in accordance with embodiments of the present disclosure.

According to the specific example illustrated, the conical transducer ring 26 comprises a large number of transducer elements 28 arranged circumferentially about inspection tool 24. For example, 128 transducer elements may be utilized about the circumference of conical transducer ring 26 although a greater number or lesser number of transducer elements 28 may be utilized according to the parameters of a given application. In general, the transducer elements 28 may be formed as relatively narrow strips so as to fully cover the internal diameter of a surrounding tubular element 30, e.g. riser, casing, flow line, as further illustrated in FIG. 5. As also illustrated in FIG. 5, the inspection tool 24/transducer ring 26 may be mounted on a pig 31 or other suitable device to form a free-swimming structure able to move with fluid along the interior of tubular element 30.

In some applications, a more focused ultrasonic beam can be produced by utilizing phased array technology in which groups of transducer elements 28, e.g. groups of five transducer elements 28, are excited individually with a specific small time delay so as to shape the ultrasonic beam. The resulting ultrasonic beam has less divergence and results in a more focused beam applied against the wall of the surrounding tubular element 30, as indicated on the right side of FIG. 5. By way of example, this approach makes it possible to generate a beam width on the order of ¼ inch or smaller and this type of focused beam works well for detecting cracks during an in-service crack inspection via, for example, and ILI technique. In this manner, the inner wall of tubular element 30 can be probed with, for example, 360/128 degree steps. Even smaller steps are possible because the phased array technology also can steer the beam angle.

Figure 6:
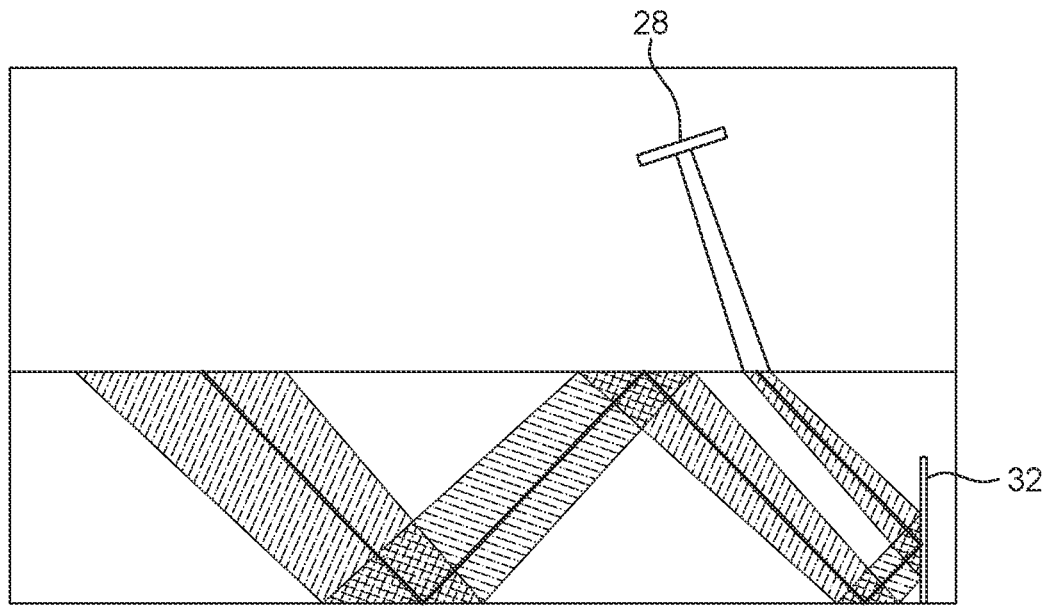
FIG. 6 is an illustration showing difficulties in detecting cracks with greater heights in accordance with embodiments of the present disclosure.
Figure 7:
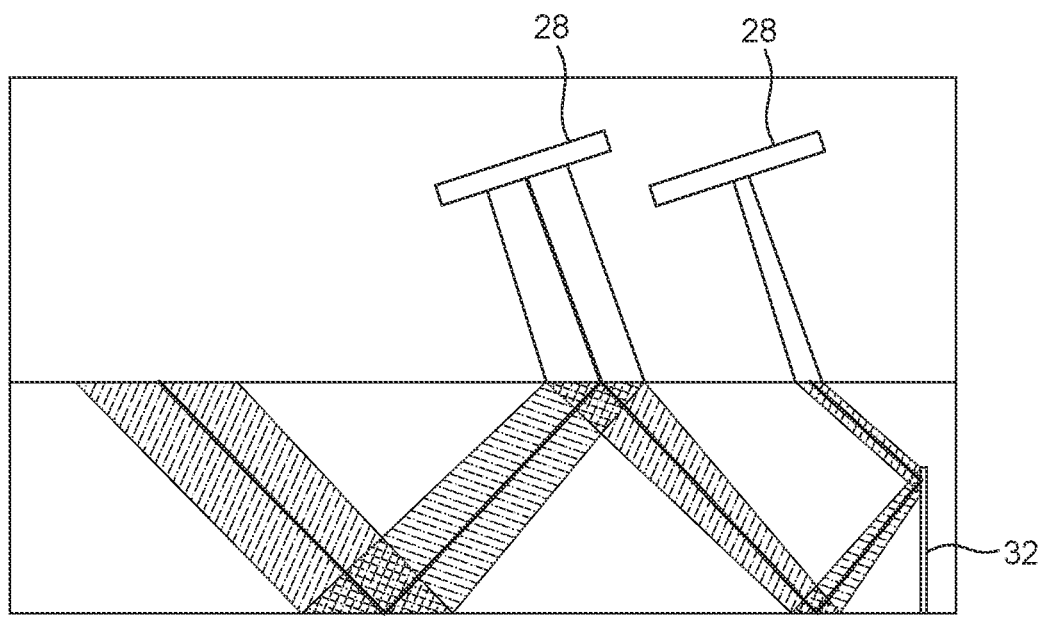
FIG. 7 is an illustration of the use of a plurality of transducers arranged to facilitate detection of cracks with greater heights in accordance with embodiments of the present disclosure.

Referring generally to FIGS. 6 and 7, another technique or additive technique is illustrated to facilitate accurate sizing of cracks 32 having substantial heights, e.g. cracks 32 with a height above 4 mm. With cracks 32 having height above 4 mm, a problem that occurs is reflection of the ultrasonic beam no longer returns to the transducer. Because the ultrasound reflection from the taller crack 32 does not reach the transducer, the crack 32 cannot be measured accurately (see FIG. 6). However, by using a plurality of transducers, e.g. transducers 28, the additional transducer or transducers are able to receive a reflection from the top part of the crack 32 so that it becomes possible to estimate the correct size of the crack, as illustrated in FIG. 7. In some applications, the additional transducer(s) 28 can be made somewhat larger to increase the probability that an echo is measured. This tandem transducer approach is readily combined with the conical transducer ring embodiment described above with reference to FIGS. 4 and 5. An example of this combined approach is illustrated by the use of two sequential conical transducer rings 26 as shown on the left side of FIG. 8.

Figure 8:
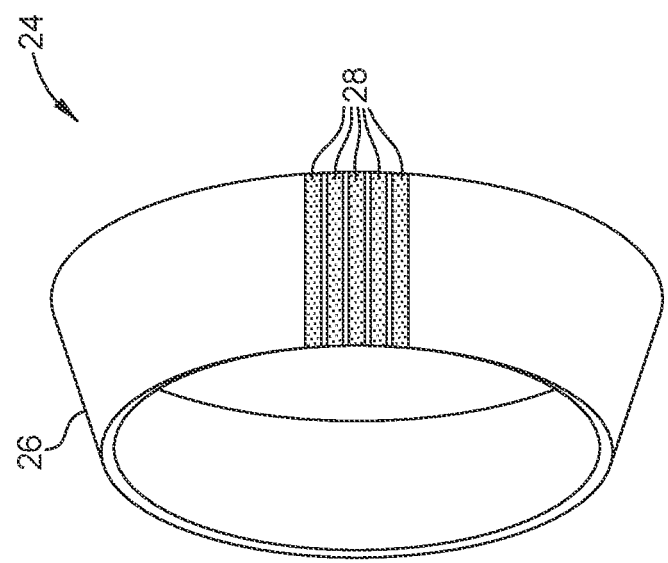
FIG. 8 is an illustration of another example of a system which may be used for the in-service detection of cracks in accordance with embodiments of the present disclosure.
Figure 8:
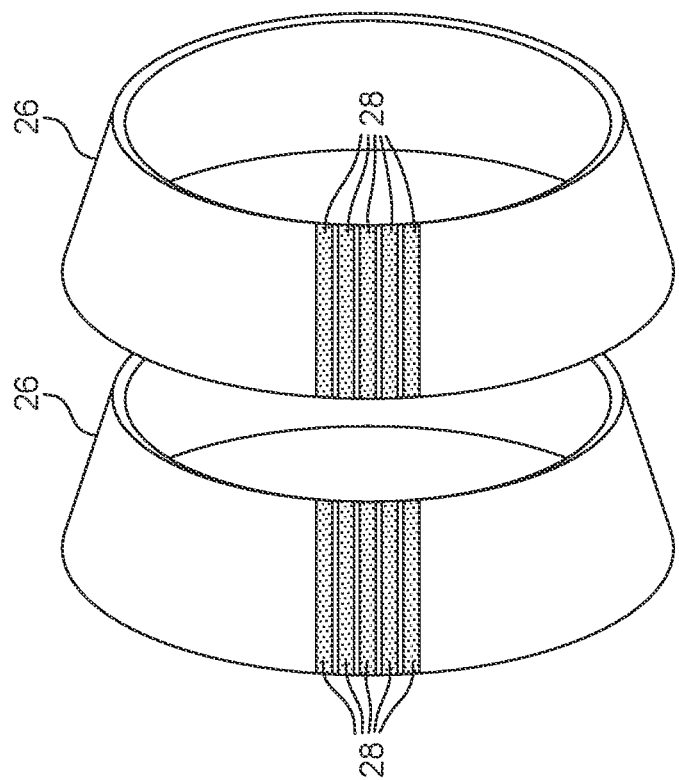

With additional reference to FIG. 8, a tip diffraction approach also may be applied by placing two conical transducer rings 26 in an orientation facing each other, as indicated by the two rings 26 shown on the right side of FIG. 8. This arrangement makes it possible to measure tip diffraction from crack tips in a manner which is analogous to a time-of-flight diffraction (ToFD) technique. The tip diffraction approach is very useful for accurate measurement of crack height provided the position of the crack is known. However, the crack position may be derived from CR measurements as described above. The tandem transducer ring technique and the tip diffraction technique may be combined by utilizing three conical transducer rings 26 as shown by the overall illustration in FIG. 8.

Various servicing techniques and other techniques may be utilized within tubular elements by flowing a pig along the interior of the tubular element. The CR techniques described above may be combined with the use of pigs or other internal free-swimming techniques to inspect girth welds, other types of welds, or other potential defects at full pig velocity. A free-swimming pig combined with the conical transducer ring or rings 26, for example, provides a minimally invasive inspection solution for offshore deep-water riser inspection.

Figure 9:
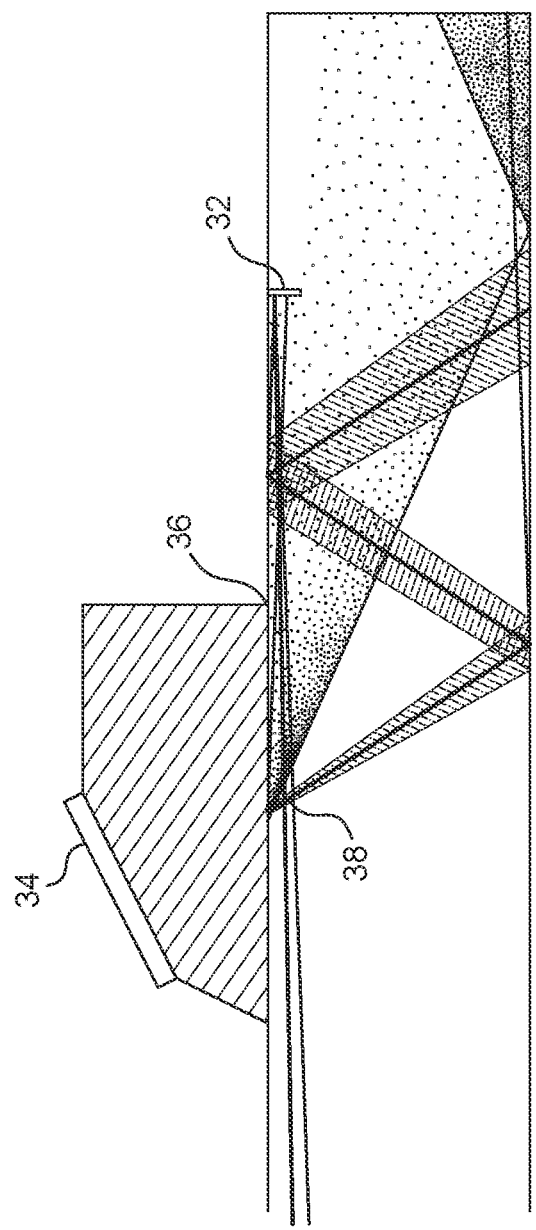
FIG. 9 is an illustration of another technique which may be used for the in-service detection of cracks in accordance with embodiments of the present disclosure.

In some applications, however, other techniques may be employed if space is extremely limited, such as the very limited space found in the smallest internal diameter risers. In such situations, ToFD may be combined with creep wave (CW) technology to provide a suitable alternative. A creep wave is a pressure wave that propagates just below the surface. As further illustrated in FIG. 9, a creep wave transducer 34 may be used to generate two wave modes in a wall of the tubular element 30.

In this particular example, the creep wave transducer 34 generates two wave modes in the form of a pressure wave 36 at an angle of about 76° to 88° and a shear wave 38 at a suitable angle, e.g. about 320. Reflection at surfaces causes wave mode conversion. In this example, a 3 mm high notch/crack 32 reflects the pressure wave 36 back to the transducer 34 which is thereby able to detect the presence of the notch/crack 32. This technique is capable of accurate crack length sizing and may be used with various in-service inspection approaches. Depending on the application, the ToFD techniques may be combined with various CR techniques.

Although a few embodiments of the disclosure have been described in detail above, those of ordinary skill in the art will readily appreciate that many modifications are possible without materially departing from the teachings of this disclosure. For example, the pipe isolation device of the present disclosure may be modified by adding additional sealing heads to become a triple, or more, block and bleed apparatus. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method of in-service inspection for defects of tubular elements, comprising:
   providing an inspection tool with a plurality of ultrasonic transducer elements arranged circumferentially;
   positioning the inspection tool on a pig;
   flowing the pig and the inspection tool along an interior of the tubular element; operating the plurality of ultrasonic transducer elements to provide a focused ultrasonic beam; and
   using reflections of the focused ultrasonic beam to determine the presence of one or more cracks in the tubular element,
   wherein providing comprises providing a conical transducer ring with the plurality of ultrasonic transducer elements arranged circumferentially about the conical transducer ring, and
   wherein providing comprises providing a plurality of the conical transducer rings so as to form the inspection tool as a tandem transducer ring inspection tool.

2. The method as recited in claim 1, wherein using comprises using a corner reflection technique.

3. The method as recited in claim 1, wherein using comprises using a time-of-flight diffraction technique.

4. The method as recited in claim 1, wherein the tubular element comprises deep-water risers, flowlines, or pipelines.

5. The method as recited in claim 1, wherein the tubular element has an internal diameter ranging from approximately 4 to 16 inches.

6. A method of in-service inspection for defects of tubular elements, comprising:
   providing an inspection tool with a plurality of ultrasonic transducer elements arranged circumferentially;
   positioning the inspection tool on a pig;
   flowing the pig and the inspection tool along an interior of the tubular element; operating the plurality of ultrasonic transducer elements to provide a focused ultrasonic beam; and
   using reflections of the focused ultrasonic beam to determine the presence of one or more cracks in the tubular element,
   wherein providing comprises providing a conical transducer ring with the plurality of ultrasonic transducer elements arranged circumferentially about the conical transducer ring, and
   wherein providing comprises providing a plurality of the conical transducer rings such that a pair of the conical transducer rings face each other so as to form the inspection tool as a tip diffraction inspection tool.

7. An in-line inspection system for inspecting in-service tubular elements, comprising:

a conical transducer ring adapted for engagement with a pipeline pig;
a plurality of ultrasonic transducer elements arranged circumferentially around the conical transducer ring; and
a plurality of conical transducer rings so as to form a tandem transducer ring inspection system.

8. The in-line inspection system of claim 7, wherein the ultrasonic transducer elements employ corner reflection inspection methodologies.

9. The in-line inspection system of claim 7, wherein the ultrasonic transducer elements employer time-of-flight diffraction methodologies.

10. An in-line inspection system for inspecting in-service tubular elements, comprising:
a conical transducer ring adapted for engagement with a pipeline pig;
a plurality of ultrasonic transducer elements arranged circumferentially around the conical transducer ring; and
a plurality of conical transducer rings such that a pair of the conical transducer rings face each other so as to form the inspection system as a tip diffraction inspection system.

11. The in-line inspection system of claim 7, wherein the conical transducer ring is sized to fit within a tubular element having an internal diameter between 4 and 16 inches.

* * * * *